United States Patent
Farid et al.

(10) Patent No.: US 8,538,140 B2
(45) Date of Patent: Sep. 17, 2013

(54) DEVICE AND METHOD FOR DETECTING WHETHER AN IMAGE IS BLURRED

(75) Inventors: Hany Farid, White River Junction, VT (US); Li Hong, San Diego, CA (US)

(73) Assignee: Nikon Corporation, Tokyo (JP)

( * ) Notice: Subject to any disclaimer, the term of this patent is extended or adjusted under 35 U.S.C. 154(b) by 329 days.

(21) Appl. No.: 12/933,857

(22) PCT Filed: Jun. 22, 2009

(86) PCT No.: PCT/US2009/048165
§ 371 (c)(1),
(2), (4) Date: Sep. 21, 2010

(87) PCT Pub. No.: WO2010/008802
PCT Pub. Date: Jan. 21, 2010

(65) Prior Publication Data
US 2011/0019909 A1    Jan. 27, 2011

Related U.S. Application Data

(60) Provisional application No. 61/074,928, filed on Jun. 23, 2008.

(51) Int. Cl.
*G06K 9/00* (2006.01)
(52) U.S. Cl.
USPC .......................................... 382/159; 382/255
(58) Field of Classification Search
USPC ............................. 382/159, 103, 228
See application file for complete search history.

(56) References Cited

U.S. PATENT DOCUMENTS

| 5,974,159 | A | 10/1999 | Lubin et al. |
| 2004/0056174 | A1 | 3/2004 | Specht et al. |
| 2005/0175235 | A1* | 8/2005 | Luo et al. ..................... 382/159 |
| 2006/0039593 | A1 | 2/2006 | Sammak et al. |
| 2007/0098254 | A1* | 5/2007 | Yang et al. .................... 382/159 |
| 2007/0177805 | A1 | 8/2007 | Gallagher et al. |

OTHER PUBLICATIONS

PCT Notification of Transmittal of International Preliminary Report on Patentability for PCT/US2009/048165 (related to the present application), mailed Mar. 27, 2012, Nikon Corporation.

(Continued)

*Primary Examiner* — Hadi Akhavannik
(74) *Attorney, Agent, or Firm* — Roeder & Broder LLP; Steven Roeder

(57) ABSTRACT

The present invention is directed to a method for detecting or predicting (302, 602) whether a test image is blurred. In one embodiment, the method includes extracting a training statistical signature (366) that is based on a plurality of data features (362, 364) from a training image set (14, 16), the training image set (14, 16) including a sharp image (14) and a blurry image (16); training a classifier (368) to discriminate between the sharp image (14) and the blurry image (16) based on the training statistical signature; and applying (302, 602) the trained classifier to a test image that is not included in the training image set (14, 16) to predict whether the test image is sharp (18) or blurry (20). The step of extracting can include measuring one or more statistical moments (576, 776) for various levels ($L_0$-$L_5$), estimating a covariance (577, 777) between adjacent levels ($L_0$-$L_5$), and/or extracting various metadata features (364, 664) from the images (14, 16). The step of training (300, 600) can include training a non-linear support vector machine (300) or a linear discriminant analysis (600) on the training statistical signature of the training image set (14, 16).

37 Claims, 13 Drawing Sheets

(56) References Cited

OTHER PUBLICATIONS

Ping Hsu and Bing-Yu Chen, Blurred Image Detection and Classification, MMM 2008, pp. 277-286, LNCS 4903, © 2008 Springer-Verlag Berlin Heidelberg.

International Search Report and Written Opinion for PCT/US2009/048165 (related to the present application), publication date Aug. 14, 2009, Nikon Corporation.

Ming-Yang Yu et al., Smart Album—Photo Filtering by Effect Detections, SIGGRAPH 2008, Aug. 11-15, 2008, ISBN 978-1-60558-466-9/08/20008, Los Angeles, CA.

Renting Liu et al., Image Partial Blur Detection and Classification, Dept. of Computer Science and Engineering, The Chinese University of Hong Hong, 978-1-4244-2243-2/08 {rtliu,zrli, leojia}@cse.cuhk.edu.hk.The work described in this paper was fully supported by a grant from Research Grants Council of Hong Kong Special Administrative Region, China (Project No. 412307) © 2008 IEEE.

Gonsalves, Robert A., Phase retrieval and diversity in adaptive optics, Optical Engineering, Sep./Oct. 1982/vol. 21 No. 5, pp. 829-832, © 1982 Society of Photo-Optical Instrumentation Engineers.

* cited by examiner

DEVICE AND METHOD FOR DETECTING WHETHER AN IMAGE IS BLURRED

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, if the camera is not properly focused when the image is captured, that image will be blurred.

Currently, there are certain methods that are used to determine whether the image is blurred. Unfortunately, many of these methods associate blur degree with edge spreading in the image. As a result thereof, their performance is rather sensitive to the accuracy of edge detection techniques. For a sharp and low noise image, the current edge detection techniques can achieve relatively good results. However, this performance degrades significantly for other types of images. For example, it has been complicated to attain robust performance for specific image types, such as macros, close-up portraits and night scenes. Additionally, it has also been difficult to achieve robust performance for large scale testing sets that cover multiple image types and various camera settings.

SUMMARY

The present invention is directed to a method for detecting or predicting whether a test image is blurred. In one embodiment, the method includes extracting a training statistical signature that is based on a plurality of data features from a training image set, the training image set including sharp images and blurry images; training a classifier to discriminate between the sharp images and the blurry images based on the training statistical signature; and applying the trained classifier to a test image that is not included in the training image set to predict whether the test image is sharp or blurry.

In one embodiment, the step of extracting includes decomposing one of the images in the training image set using a multi-scale image decomposition that includes a plurality of levels, such as a Laplacian pyramid, a steerable pyramid or a wavelet pyramid.

In another embodiment, the step of extracting includes measuring one or more statistical moments for at least one level of the Laplacian pyramid. These statistical moments can include one or more of (i) a mean, (ii) a standard deviation, (iii) skewness, and (iv) kurtosis.

In some embodiments, the step of extracting includes estimating a covariance between level N and level N+1 of the Laplacian pyramid.

In certain embodiments, the step of extracting includes extracting a metadata feature of at least one of the images. In one such embodiment, the metadata features can include one or more of a focal length, an f-number, an ISO sensitivity, an exposure time, a flash, an exposure value and a handholdable factor (X).

In one embodiment, the step of training includes training a non-linear support vector machine on the training statistical signature of the training image set. Alternatively, the step of training can include training a linear discriminant analysis on the training statistical signature of the training image set.

In certain embodiments, the step of applying includes extracting a testing statistical signature from the test image.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
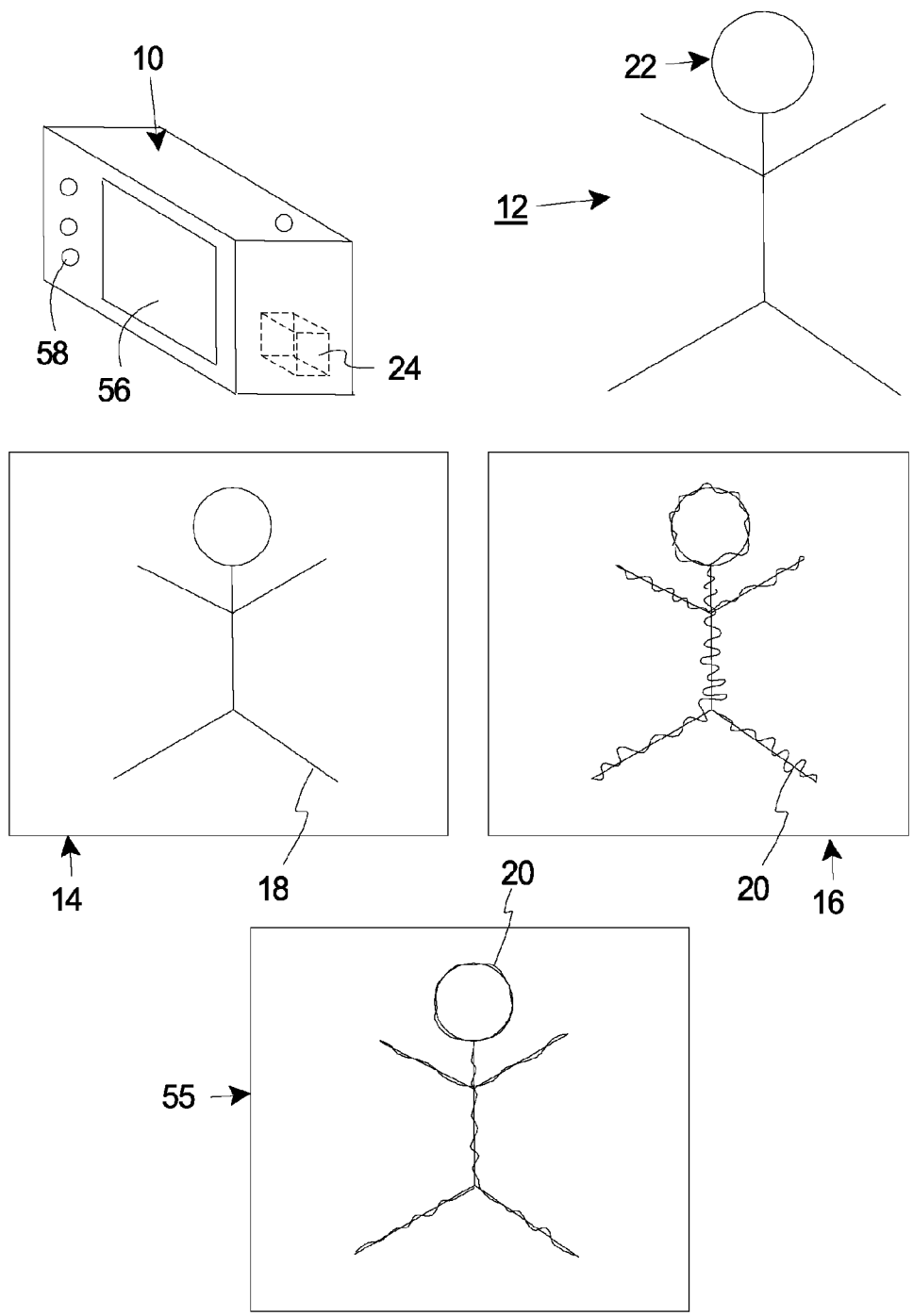
FIG. 1 is a simplified view of a scene, an image apparatus having features of the present invention, a raw, first captured image of the scene, a raw, second captured image of the scene, and an adjusted image.

FIG. 1 is a simplified perspective view of an image apparatus 10 having features of the present invention, and a scene 12. FIG. 1 also illustrates a raw first captured image 14 (illustrated away from the image apparatus 10), and a raw second captured image 16 (illustrated away from the image apparatus 10), each captured by the image apparatus 10. In FIG. 1, the first captured image 14 is intended to illustrate a sharp image 18 (including non-wavy lines) and the second captured image 16 is intended to illustrate image blur 20 (including wavy lines). For example, movement of the image apparatus 10, and/or movement of an object 22 in the scene 12 during the capturing of the blurred image 16 can cause motion blur 20 in the image 14. Additionally, or in the alternative, blur 20 in the image 16 can be caused by the image apparatus 10 not being properly focused when the image 14 is captured.

In one embodiment, as provided herein, the image apparatus 10 includes a control system 24 (illustrated in phantom) that uses one or more unique methods for detecting if one or more of the captured images 14, 16 are blurred beyond a predetermined threshold that can be established by the user.

As a result of using the method(s) to evaluate each image 14, 16, the present invention provides a device and method for determining whether a particular image 14, 16 is blurred or sharp with improved accuracy. Subsequently, a deblurring process can be applied to only the images 16 that are determined to be blurred. Thus, a sharp image 14 will not be unnecessarily subjected to the deblurring process.

The type of scene 12 captured by the image apparatus 10 can vary. For example, the scene 12 can include one or more objects 22, e.g. animals, plants, mammals, and/or environments. For simplicity, in FIG. 1, the scene 12 is illustrated as including one object 22. Alternatively, the scene 12 can include more than one object 22. In FIG. 1, the object 22 is a simplified stick figure of a person, although it is recognized that the object 22 in FIG. 1 can be any object 22 and is representative of any suitable image. For instance, the scenes 12 can include macros, close-up portraits and/or night scenes, as non-exclusive examples.

Figure 2:
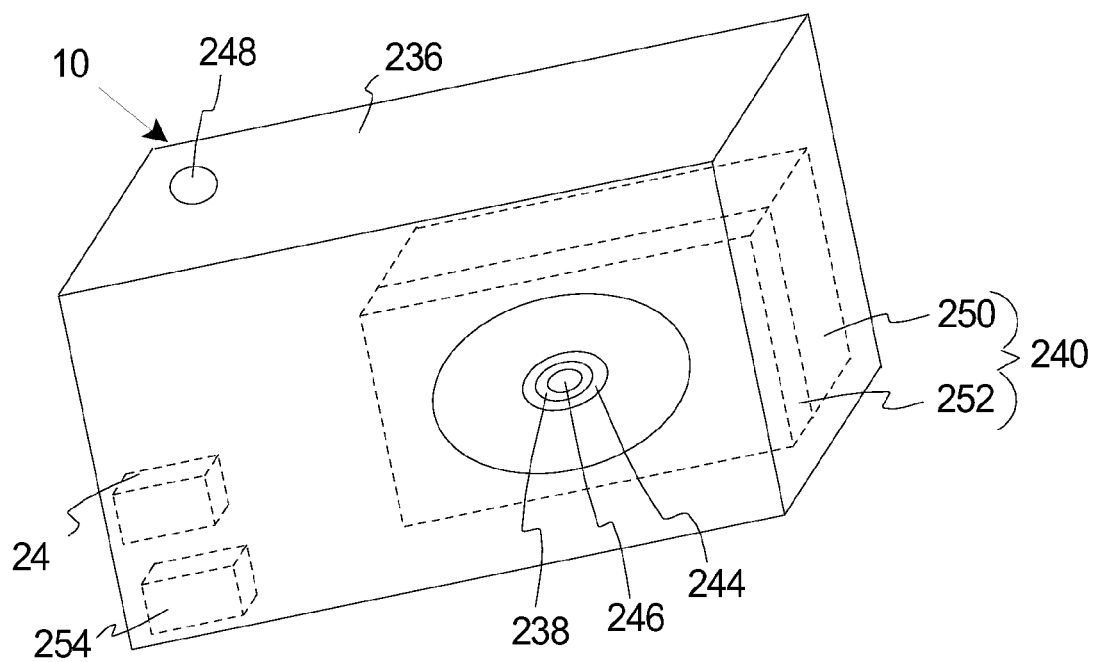
FIG. 2 is a simplified front perspective view of the image apparatus in FIG. 1.

FIG. 2 illustrates a simplified, front perspective view of one non-exclusive embodiment of the image apparatus 10. In this embodiment, the image apparatus 10 is a digital camera, and includes an apparatus frame 236, an optical assembly 238, and a capturing system 240 (illustrated as a box in phantom), in addition to the control system 24 (illustrated as a box in phantom). The design of these components can be varied to suit the design requirements and type of image apparatus 10. Further, the image apparatus 10 could be designed without one or more of these components. Additionally or alternatively, the image apparatus 10 can be designed to capture a video of the scene 12.

The apparatus frame 236 can be rigid and support at least some of the other components of the image apparatus 10. In one embodiment, the apparatus frame 236 includes a generally rectangular shaped hollow body that forms a cavity that receives and retains at least some of the other components of the camera.

The apparatus frame 236 can include an aperture 244 and a shutter mechanism 246 that work together to control the amount of light that reaches the capturing system 240. The shutter mechanism 246 can be activated by a shutter button 248. The shutter mechanism 246 can include a pair of blinds (sometimes referred to as "blades") that work in conjunction with each other to allow the light to be focused on the capturing system 240 for a certain amount of time. Alternatively, for example, the shutter mechanism 246 can be all electronic and contain no moving parts. For example, an electronic capturing system 240 can have a capture time controlled electronically to emulate the functionality of the blinds.

The optical assembly 238 can include a single lens or a combination of lenses that work in conjunction with each other to focus light onto the capturing system 240. In one embodiment, the image apparatus 10 includes an autofocus assembly (not shown) including one or more lens movers that move one or more lenses of the optical assembly 238 in or out until the sharpest possible image of the subject is received by the capturing system 240.

The capturing system 240 captures information for the images 14, 16 (illustrated in FIG. 1). The design of the capturing system 240 can vary according to the type of image apparatus 10. For a digital-type camera, the capturing system 240 includes an image sensor 250 (illustrated in phantom), a filter assembly 252 (illustrated in phantom), and a storage system 254 (illustrated in phantom).

The image sensor 250 receives the light that passes through the aperture 244 and converts the light into electricity. One non-exclusive example of an image sensor 250 for digital cameras is known as a charge coupled device ("CCD"). An alternative image sensor 250 that may be employed in digital cameras uses complementary metal oxide semiconductor ("CMOS") technology.

The image sensor 250, by itself, produces a grayscale image as it only keeps track of the total quantity of the light that strikes the surface of the image sensor 250. Accordingly, in order to produce a full color image, the filter assembly 252 is generally used to capture the colors of the image.

The storage system 254 stores the various images before these images are ultimately printed out, deleted, transferred or downloaded to an auxiliary storage system or a printer. The storage system 254 can be fixedly or removable coupled to the apparatus frame 236. Non-exclusive examples of suitable storage systems 254 include flash memory, a floppy disk, a hard disk, or a writeable CD or DVD.

The control system 24 is electrically connected to and controls the operation of the electrical components of the image apparatus 10. The control system 24 can include one or more processors and circuits, and the control system 24 can be programmed to perform one or more of the functions described herein. In FIG. 2, the control system 24 is secured to the apparatus frame 236 and the rest of the components of the image apparatus 10. Further, in this embodiment, the control system 24 is positioned within the apparatus frame 236.

Referring back to FIG. 1, in certain embodiments, the control system 24 includes software and/or firmware that utilizes one or more methods to determine if a given image 14, 16 is sharp or blurred, as described herein. In various embodiments, the controller 24 includes firmware that has previously been programmed or "trained" during the manufacturing process and/or software that detects whether a new image (also sometimes referred to herein as a "test image") subsequently taken by the image apparatus 10 is sharp or blurred. As provided herein, a line of separation between what is considered a sharp image 14 and what is considered a blurred image 16 can be adjusted to suit the requirements of the user.

Further, in certain embodiments, the control system 24 can include software that reduces the amount of blur 20 in a blurred image 16 to provide an adjusted image 55. In this example, the control system 24 can determine that the first image 14 is sharp and that no further processing is necessary. Further, the control system 24 can determine that the second image 16 is blurred. Subsequently, the control system 24 reduces the blur in the second image 16 to provide the adjusted image 55.

The image apparatus 10 can include an image display 56 that displays the raw images 14, 16 and/or the adjusted image 55. With this design, the user can decide which images 14, 16, 55, should be stored and which images 14, 16, 55, should be deleted. In FIG. 1, the image display 56 is fixedly mounted to the rest of the image apparatus 10. Alternatively, the image display 56 can be secured with a hinge mounting system (not shown) that enables the display 56 to be pivoted. One non-exclusive example of an image display 56 includes an LCD screen. Further, the image display 56 can display other information that can be used to control the functions of the image apparatus 10.

Moreover, the image apparatus 10 can include one or more control switches 58 electrically connected to the control system 24 that allows the user to control the functions of the image apparatus 10. For example, one or more of the control switches 58 can be used to selectively switch the image apparatus 10 to the blur evaluation and reduction processes disclosed herein. For example, in certain embodiments, in order to save computation, the present invention can be selectively applied (manually or automatically) to a certain type of image, e.g. close up portraits/statutes, macros, low light images, etc.

Figure 3:
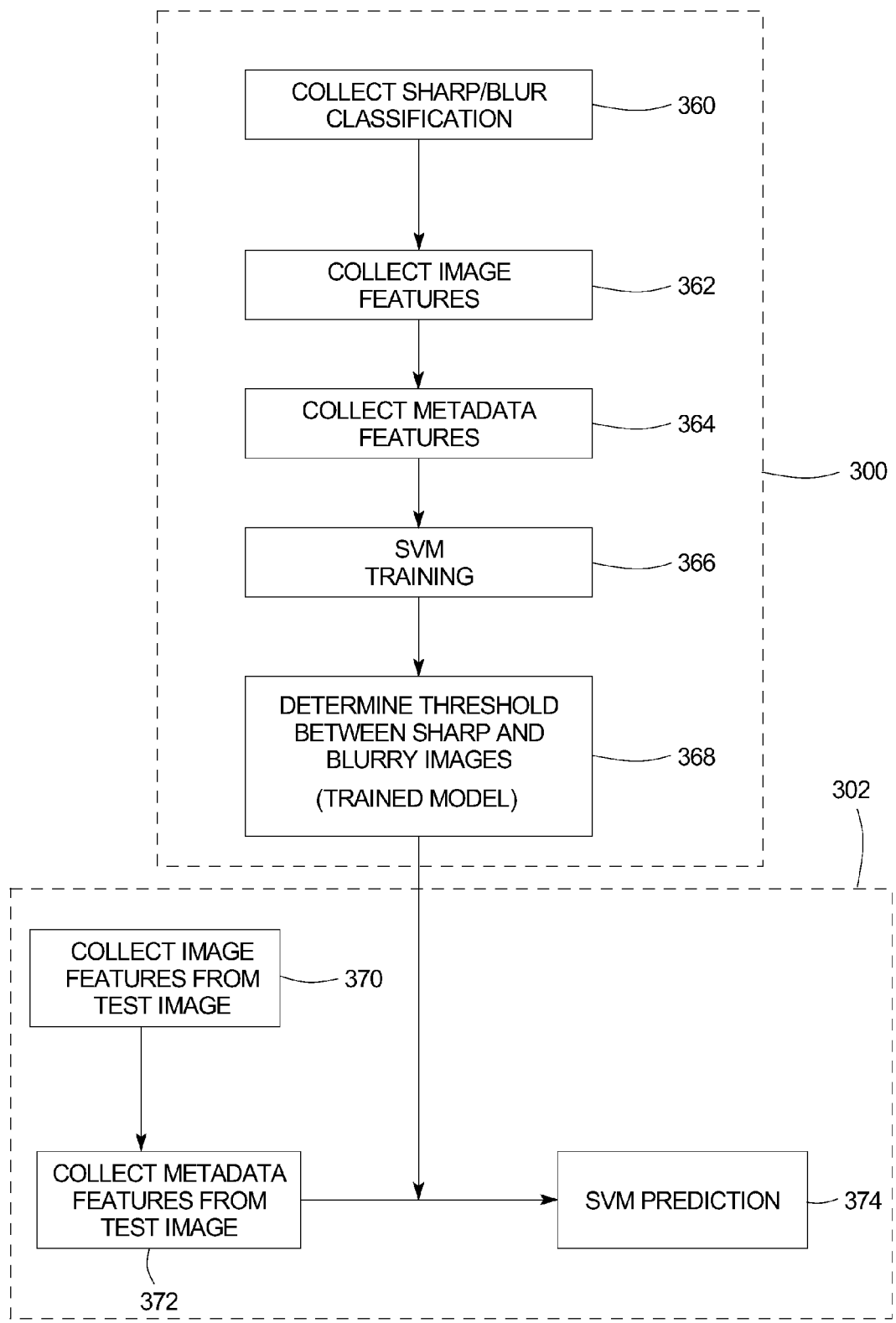
FIG. 3 is a flow chart that illustrates one embodiment of an image classification procedure having features of the present invention.

FIG. 3 is a flow chart that illustrates one embodiment of an image detection process having features of the present invention. In this embodiment, the image detection process can include a training phase (illustrated as dashed box 300) and a testing phase (illustrated as dashed box 302). The training phase 300 utilizes a set of images (also sometimes referred to herein as a "training image set"). In one embodiment, the training image set includes at least one sharp image 14 (illustrated in FIG. 1) and at least one blurry image 16 (illustrated in FIG. 1) which are used during the training phase 300. The training phase 300 can include one or more of the following steps: collecting a sharp/blur classification 360 for each image in the training image, collecting image features 362, collecting metadata features 364, support vector machine ("SVM") training 366, and generating a training model (also sometimes referred to herein as a "classifier") that determines a separation surface between sharp and blurry images 368. As used herein, image features and metadata features are collectively referred to herein as "data features". Each of these training phase steps is described in greater detail below.

During the training phase 300, each of the images in the training image set is classified as being either sharp or blurred images at step 360. The number of images that are classified at step 360 can vary. However, in general, a greater number of images that are classified at step 360, and used during the training phase 300, will increase the accuracy during the testing phase 302. For example, hundreds or even thousands or more of each of sharp and blurry images can be used during the training phase 300.

At step 360, the images can be subjectively and/or objectively classified based on the opinion(s) of one or more persons with skills or expertise at determining sharp versus blurred images. Ideally, this classification step 360 should include a substantially consistent classification protocol of all images reviewed during the classification step 360.

Next, image features 576-579 (illustrated in FIG. 5A) are collected at step 362. The types of image features that can be collected during step 362 can vary. In order to generate the image features, each image undergoes a multi-scale image decomposition, such as a Laplacian pyramid, as one non-exclusive example, provided in greater detail below. Alternatively, other types of multi-scale image decomposition known to those skilled in the art can be utilized with the present invention, such as a steerable pyramid or a wavelet pyramid, as non-exclusive examples. Prior to the multi-scale image decomposition, each image can be converted to a grayscale image. In addition, each image can be cropped or downsized such as one-half of the original resolution, as one non-exclusive example. Further, each image can be auto-scaled to [0 255], by increasing or decreasing the contrast as needed, for example. Although it is not required that each of the foregoing steps occur prior to building the Laplacian pyramid, the training process can be enhanced in this manner.

Figure 4A:
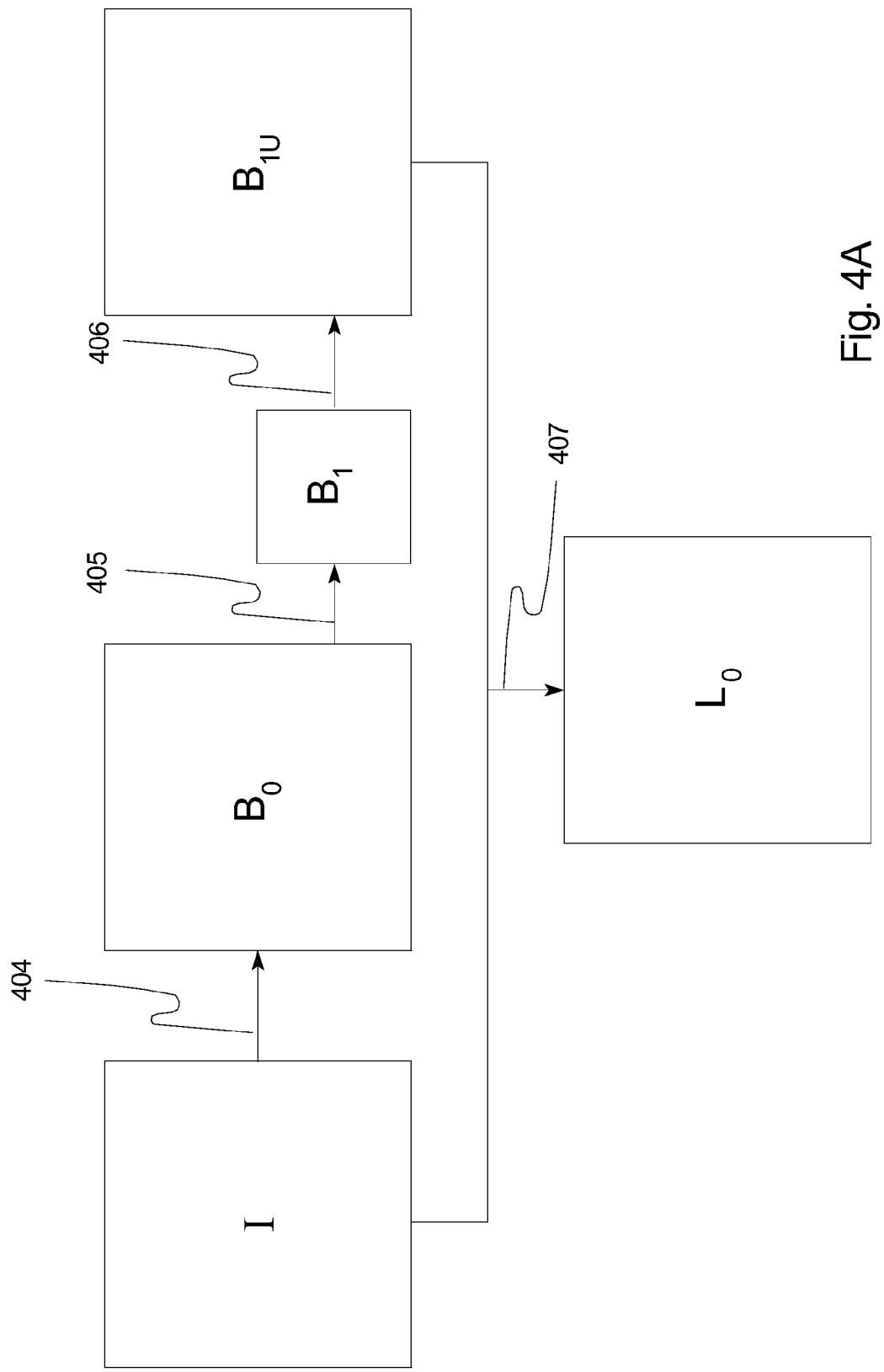
FIG. 4A is a schematic diagram that illustrates a portion of a first series of steps of a Laplacian pyramid used for one embodiment of the image classification procedure outlined in FIG. 3.
Figure 4B:
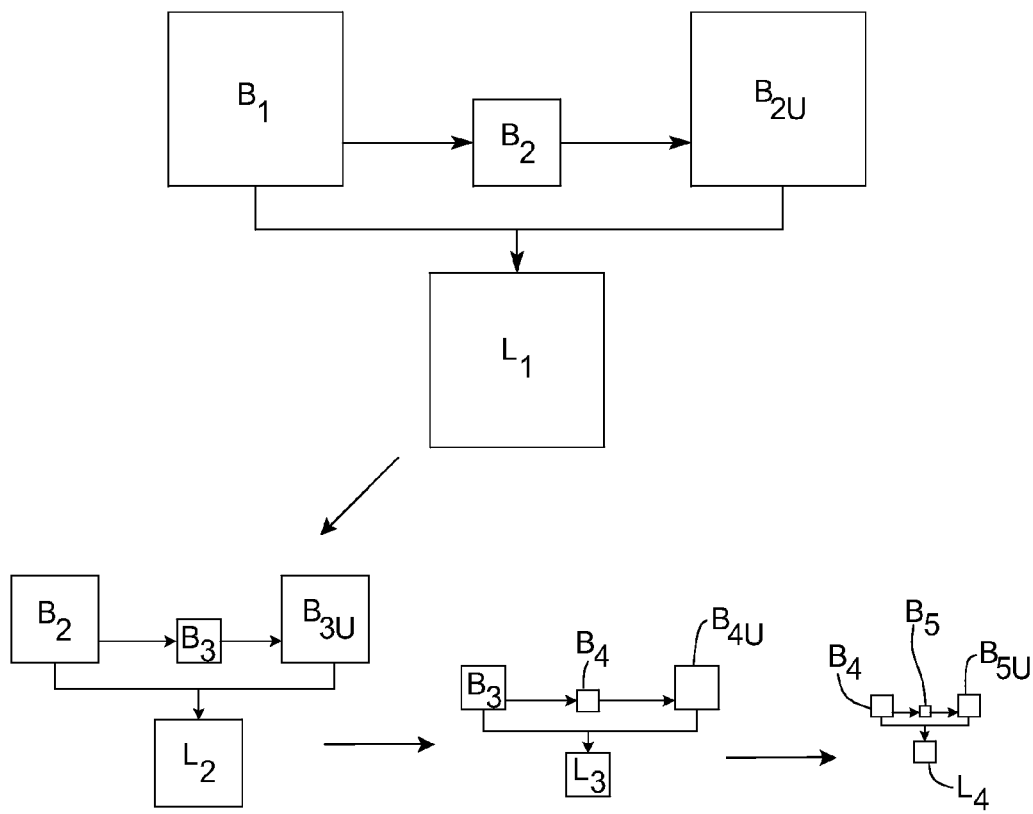
FIG. 4B is a schematic diagram that illustrates a portion of an additional series of steps of the Laplacian pyramid outlined in FIG. 4A.
Figure 4C:
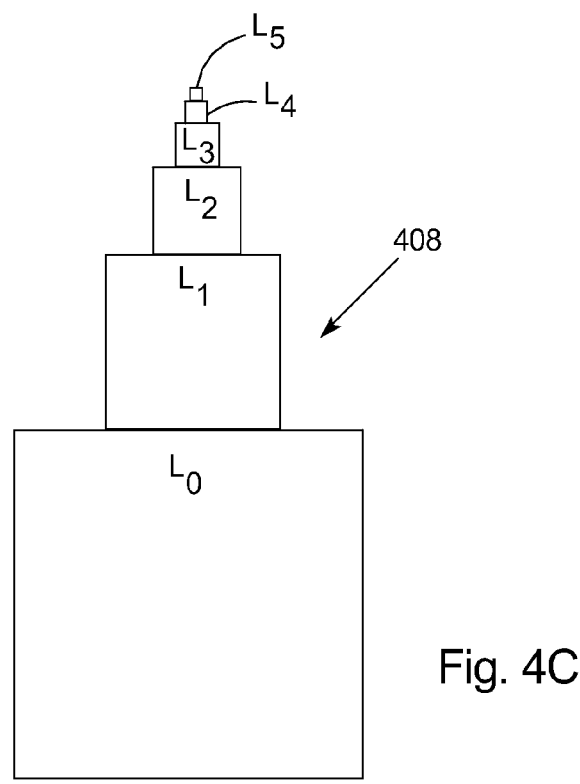
FIG. 4C is a schematic diagram that illustrates five levels of the Laplacian pyramid outlined in FIGS. 4A and 4B.

In FIGS. 4A-4C, a six level Laplacian pyramid 408 (illustrated in FIG. 4C) is described. Alternatively, it is recognized that in embodiments where a Laplacian pyramid-type decomposition is utilized, greater or fewer than six levels can be generated depending upon the design requirements of the system and/or process.

Referring to FIG. 4A, the generating the first level of the Laplacian pyramid 408 is described. An original image (I) that was previously classified in step 360 is subjected to a low pass filter to artificially blur the original image (I) into a blurred image $B_0$, at step 404. This blurred image $B_0$ is then downsampled at step 405, typically by one-half in each dimension, into image $B_1$.

At step 406, downsampled image $B_1$ is then upsampled to the same size as image $B_0$ and the original image (I), to generate image $B_{1U}$. At step 407, image $B_{1U}$ is subtracted from the original image (I) to generate the first level of the Laplacian pyramid 408, as represented by image $L_0$ in FIG. 4A.

FIG. 4B illustrates how the remainder of the Laplacian pyramid 408 is generated for a six-level pyramid. Image $B_1$ is subjected to a low pass filter and downsampled into image $B_2$ in a manner substantially similar to that described previously herein. Image $B_2$ is then upsampled to the same size as image $B_1$ to generate image $B_{2U}$. Image $B_{2U}$ is subtracted from image $B_1$ to generate the second level of the Laplacian pyramid 408, as represented by image $L_1$ in FIG. 4B. In a somewhat similar manner, certain successive levels of the Laplacian pyramid 408 is generated as illustrated in FIG. 4B, to generate images $L_2$ through $L_4$. For level $L_5$, image $B_5$ is used as is.

FIG. 4C illustrates a representation of Laplacian images $L_0$ through $L_5$, which form the Laplacian pyramid 408.

Figure 5A:
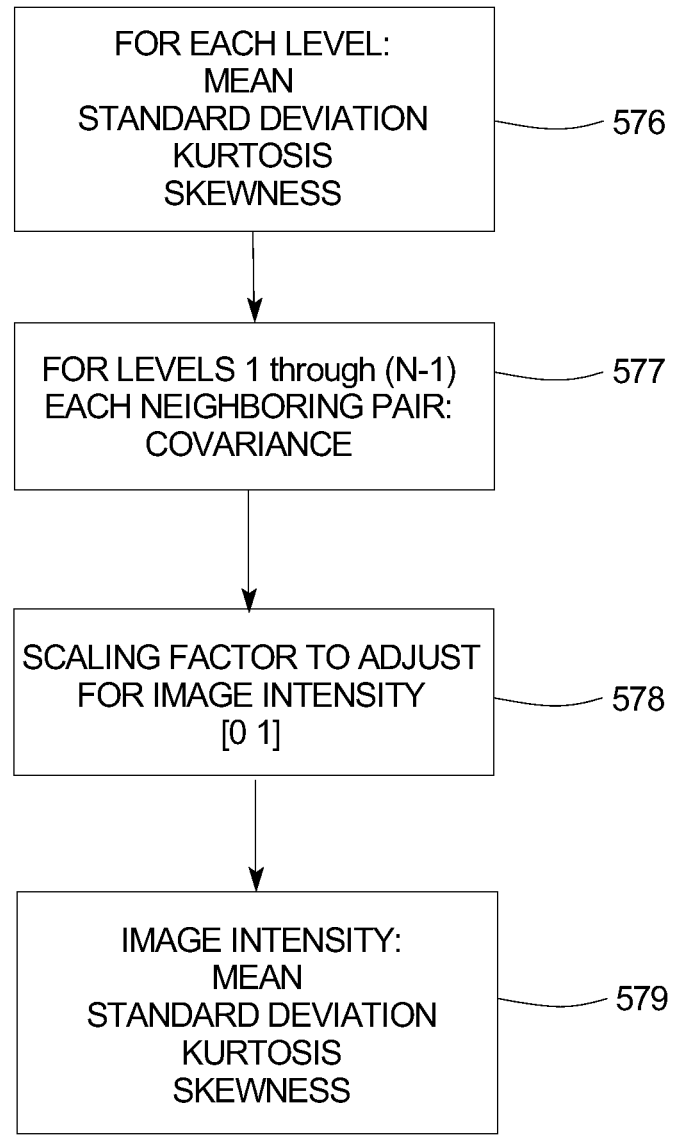
FIG. 5A is a flow chart that illustrates one embodiment of a portion of the image classification procedure outlined in FIG. 3.

FIG. 5A is a flow chart illustrating one embodiment of the methodology for collecting image features as previously indicated at step 362 in FIG. 3. In the embodiment in FIG. 5A, for each level of the Laplacian pyramid 408 (described relative to FIGS. 4A-4C), one or more statistical moments are measured at step 576. In one embodiment, the four-order statistical moments are measured, including a mean, a standard deviation, a kurtosis and a skewness, for a total of 24 image features. Alternatively, greater or fewer than 24 image features generated from the statistical moments can be utilized.

Alternatively, or additionally, at step 577, for one or more pairs of neighboring levels of the Laplacian pyramid, a covariance is determined. For example, in one embodiment, the covariance is computed between levels $L_0$ and $L_1$, $L_1$ and $L_2$, $L_2$ and $L_3$, and $L_3$ and $L_4$, for a total of four additionally image features. Alternatively, the covariance can be omitted for any of these neighboring pairs.

At step 578, a scaling factor can be applied to adjust the intensity of the original image to the [0 1] range, to provide another image feature.

At step 579, the four-order statistical moments (mean, standard deviation, kurtosis and skewness) of the intensity of the image are determined, for a total of four additional image features.

It should be noted that one or more of the steps 576-579 can be omitted without deviating from the spirit of the present invention, although to increase accuracy, each of the steps 576-579 is advisable.

Referring back to FIG. 3, the training process 300 further includes collecting metadata features at step 364.

Figure 5B:
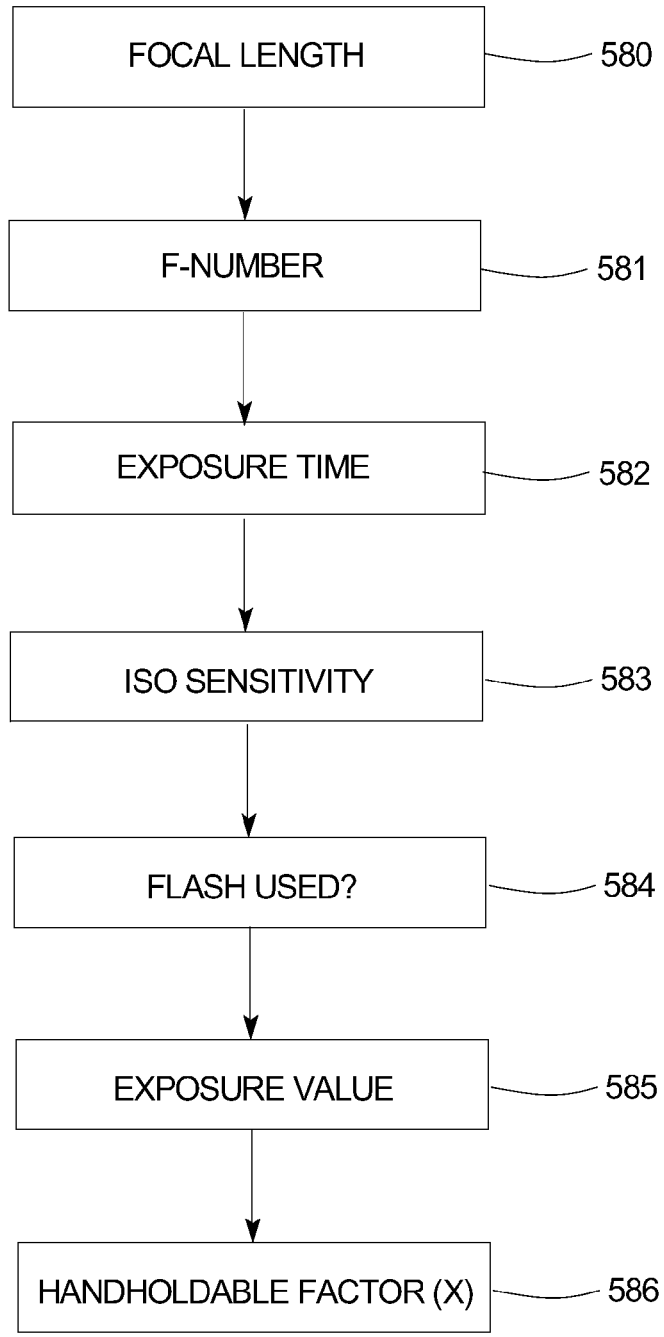
FIG. 5B is a flow chart that illustrates one embodiment of another portion of the image classification procedure outlined in FIG. 3.

FIG. 5B is a flow chart illustrating one embodiment of the methodology for collecting metadata features as previously described at step 364 in FIG. 3. In the embodiment in FIG. 5B, one or more of the metadata features (580-586) can be collected for the original image, which can include focal length 580, f-number 581, exposure time 582, ISO sensitivity 583, whether or not a flash was used to take the original image 584, an exposure value 585 and/or a handholdable factor (X) 586. Each of these metadata features is a standard feature for a typical image apparatus 10 such as a digital camera. In an alternative embodiment, the metadata features 580-586 are not collected and are not utilized during the training process 300 (illustrated in FIG. 3).

Referring again to FIG. 3, at step 366, a non-linear SVM training occurs utilizing the data features (image features and metadata features) collected from all of the images in the training image set. In general, the SVM is a relatively new generation machine learning technique based on the statistical learning theory.

Figure 5C:
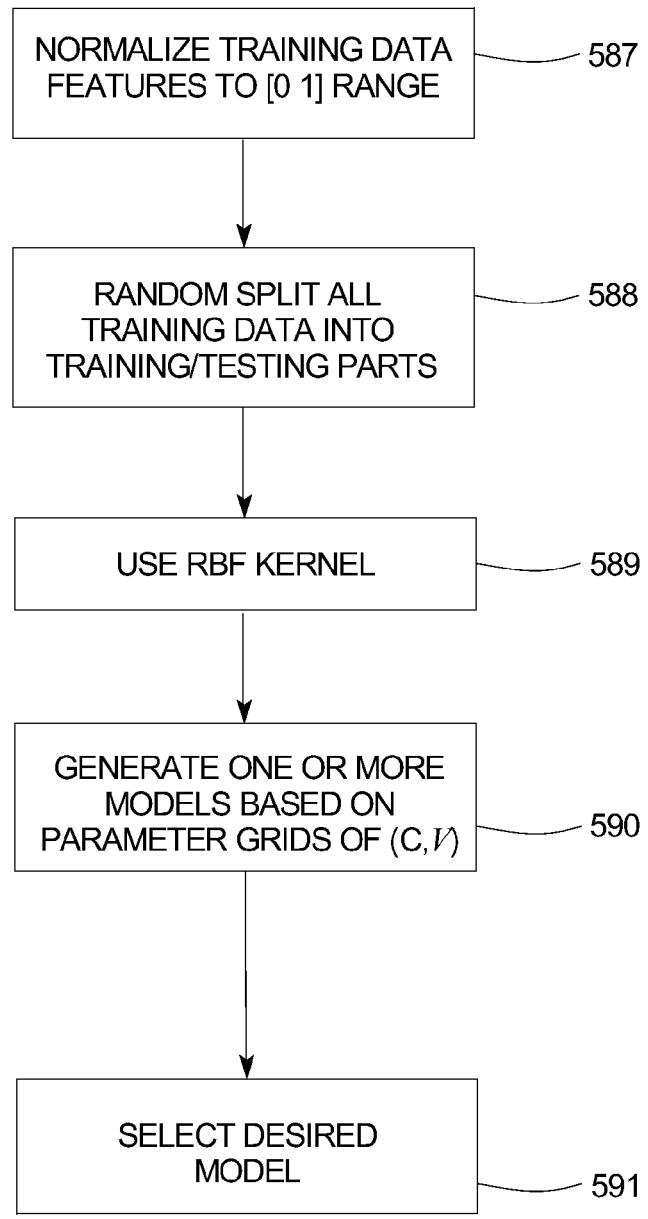
FIG. 5C is a flow chart that illustrates one embodiment of yet another portion of the image classification procedure outlined in FIG. 3.

FIG. 5C is a flow chart illustrating one embodiment of the methodology for the SVM training based on the data features collected from the training image set. In the embodiment in FIG. 5C, the data features, including the image features 576-579 and the metadata features 580-586, are normalized to the [0 1] range or another suitable range, at step 587. In so doing, any bias toward any one particular data feature is reduced or avoided. These normalized data features are also referred to herein as a "training statistical signature".

At step 588, in one embodiment, all normalized data features are randomly split into either training or testing parts. For example, the training image set and/or the normalized data features from the training image set can be split by some percentage, e.g., 80% into training and 20% into testing. In one embodiment, the split is by random selection. In this example, 80% of the training data features is used to construct the model(s) (step 590 below). The model is then used for testing of the remaining 20% of the data features. In this embodiment, less than 100% of the data features for training is used in order to avoid over-fitting of data. The model that can still give adequate or better performance will be favorable, because this model can generalize to new images. In an alternative embodiment, all 100% of the data features are used to train the model. However, in this embodiment, although the model may perform adequately or better on these data features, this model may have a higher likelihood of over-fitting.

At step 589, a radial basis function (RBF) kernel is used as the basis for the SVM. For example, the RBF kernel is represented by the equation:

$$K(x,y) = e^{-\gamma \|x-y\|^2} \quad [1]$$

wherein the kernel is a defined inner product in mapped high dimensional space.

At step 590, one or more models are generated that are based on parameter grids of (C, γ).

At step 591, cross-validation can be utilized to find the desired model. Additionally, or in the alternative, the amount of support vectors can be constrained to find the desired model. The desired model is selected from a plurality of models that have been generated in accordance with the previous steps herein. The model to be utilized in the testing phase 302 (illustrated in FIG. 3) can depend upon various factors. In one embodiment, these factors can include one or more of the type of blur being detected (motion vs. defocus), the type/quality of camera that will generate images being tested during testing phase 302, compression level of images (none, fine, coarse, etc.), denoising level, anticipated requirements of the user, etc. Alternatively, if only one model was generated, that model is then utilized for the testing phase 302.

Referring back to FIG. 3, the testing phase 302 includes one or more of collecting image features from a test image (step 370), collecting metadata features from the test image (step 372), and SVM prediction (step 374). At step 370, essentially the same process is used for the test image that was used during the training phase for collection of image features. Stated another way, the same types of image features are collected in substantially the same manner that was followed for step 362, except a test image is used. In one embodiment, different classifiers are generated to separate sharp from motion blur or to separate sharp from defocus blur. In another embodiment, different classifiers are generated to compensate for the difference of compression levels, denoising levels, etc.

Additionally, at step 372, essentially the same process is used for the test image that was used during the training phase for collection of metadata features. Stated another way, the same types of metadata features are collected in substantially the same manner that was followed for step 364, except a test image is used.

Figure 5D:
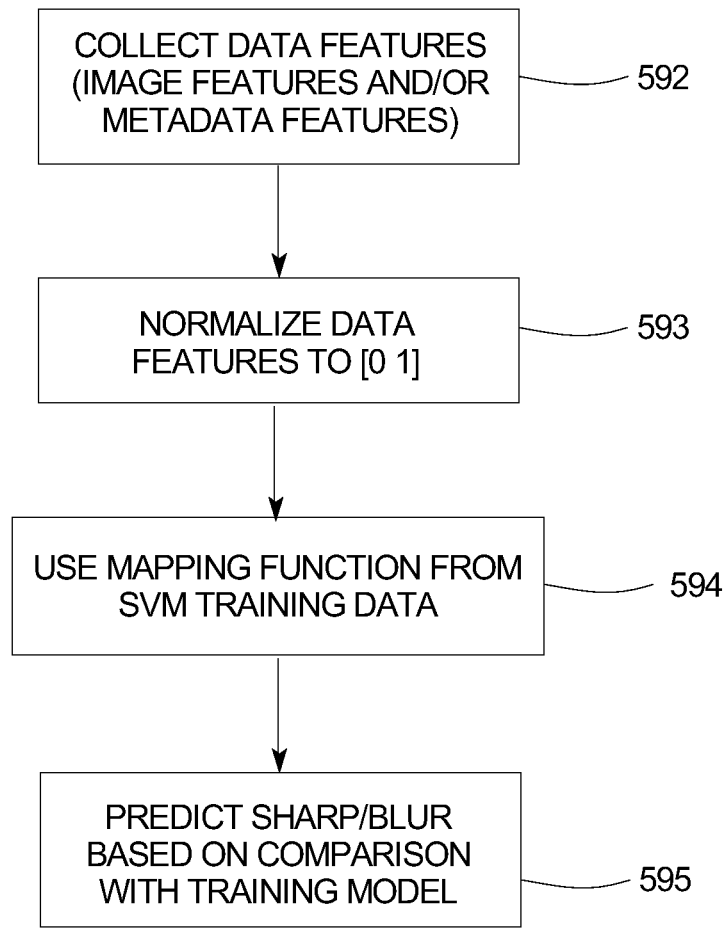
FIG. 5D is a flow chart that illustrates one embodiment of still another portion of the image classification procedure outlined in FIG. 3.

FIG. 5D is a flow chart illustrating one embodiment of the methodology for the SVM prediction of sharp or blur for the test image as illustrated in step 374 in FIG. 3. Step 592 in FIG. 5D also summarizes previously described steps 370 and 372 for the sake of continuity. The collected data features from step 592 are normalized to the range [0 1], or another suitable range at step 593, using the same mapping function from the SVM training phase 300 (illustrated in FIG. 3) at step 594. The normalized data features from the test image are also sometimes referred to herein as a "testing statistical signature".

At step 595, a prediction of whether the test image is sharp or blurry is made based on the model from the training phase 300. A weighted sum of kernel function is computed from a data feature vector to support vectors by the following equation:

$$\text{sgn}\left(\sum_{i=1}^{l} y_i \alpha_i K(x_i, x) + b\right) \quad [2]$$

where the SVM model structures include an RBF kernel type; γ is a model parameter (for RBF kernel function); $x_i$ is a supporting vector; x is a data feature from the test image; $\alpha_i$ is a corresponding weight; $y_i$ is a classification label; and b is a bias term. Based on a whether the value from the testing phase 302 which utilizes the model selected during the training phase 300 is positive or negative, a prediction and/or determination can be made for whether the test image is sharp or blurry.

Figure 6:
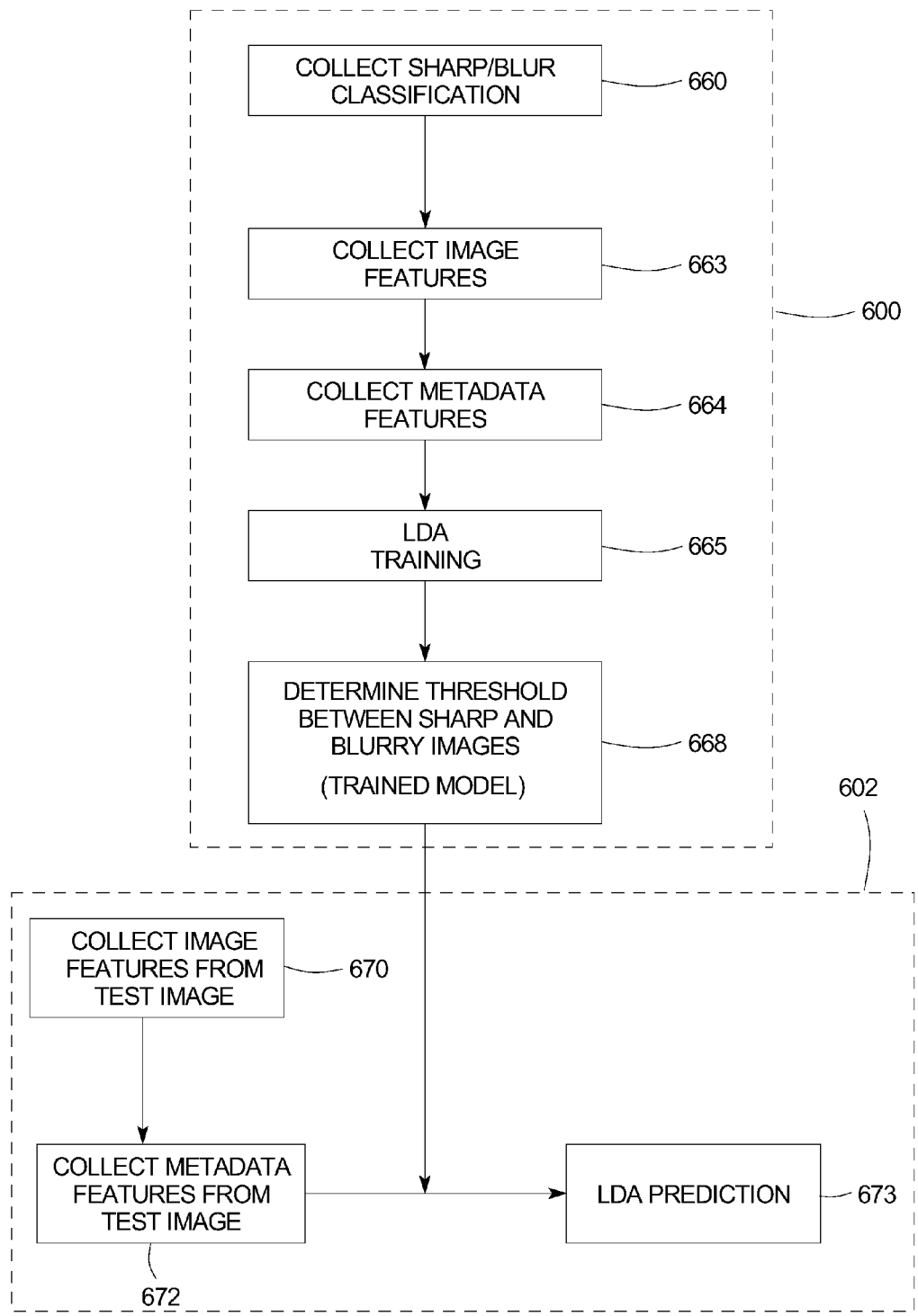
FIG. 6 is a flow chart that illustrates another embodiment of an image classification procedure having features of the present invention.

FIG. 6 is a flow chart that illustrates another embodiment of an image detection process having features of the present invention. In this embodiment, the image detection process includes a training phase (illustrated as dashed box 600) and a testing phase (illustrated as dashed box 602). In essence, the image detection process illustrated in FIG. 6 has certain similarities to that previously described relative to FIG. 3, with the following exceptions described in greater detail below.

The training phase 600 can include one or more of the following steps: collecting a sharp/blur classification 660 for each image in the training image, collecting image features 663, collecting metadata features 664, linear discrimination analysis ("LDA") training 665, and generating a training model that determines a threshold between sharp and blurry images 668. In this embodiment, the training is based on a linear analysis at step 665, rather than the non-linear analysis (SVM) described previously herein. Thus, the sharp/blur classification (step 660) and metadata feature collection (step 664) are substantially similar to those described previously herein.

Figure 7A:
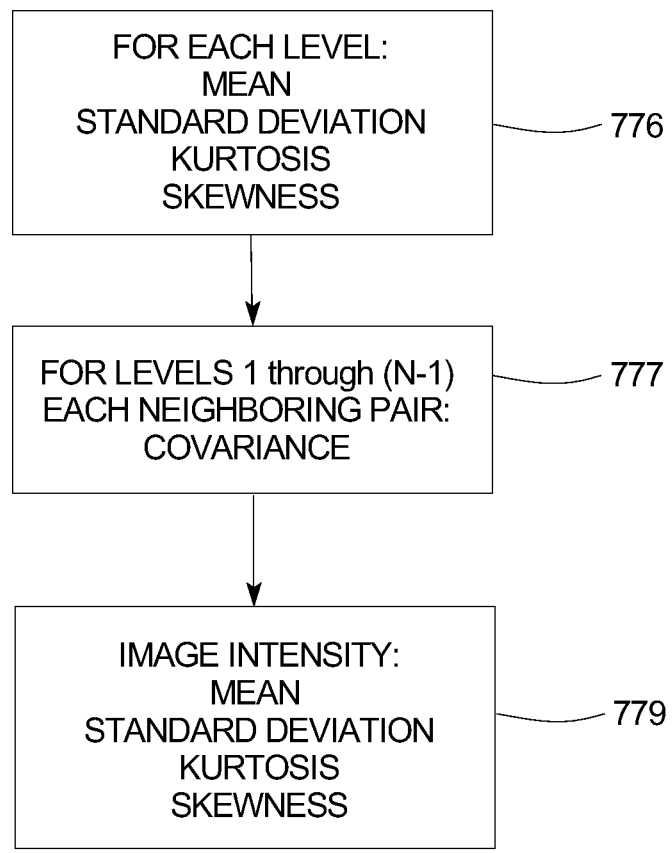
FIG. 7A is a flow chart that describes one embodiment for a collection of image features from the embodiment illustrated in FIG. 6.

FIG. 7A is a flow chart that describes one embodiment for collection of image features that occurs during step 663 in the embodiment illustrated in FIG. 6. In this embodiment, the collection of image features includes measuring the four-order statistical moments, including a mean, a standard deviation, a kurtosis and a skewness, at step 776. In one embodiment, these statistical moments can be measured for one or more, or all levels of the Laplacian pyramid.

Alternatively, or additionally, at step 777, for one or more pairs of neighboring levels of the Laplacian pyramid, a covariance is determined in a manner substantially similar to that described previously herein.

At step 779, the four-order statistical moments (mean, standard deviation, kurtosis and skewness) of the intensity of the image are determined, for a total of four additional image features.

Figure 7B:
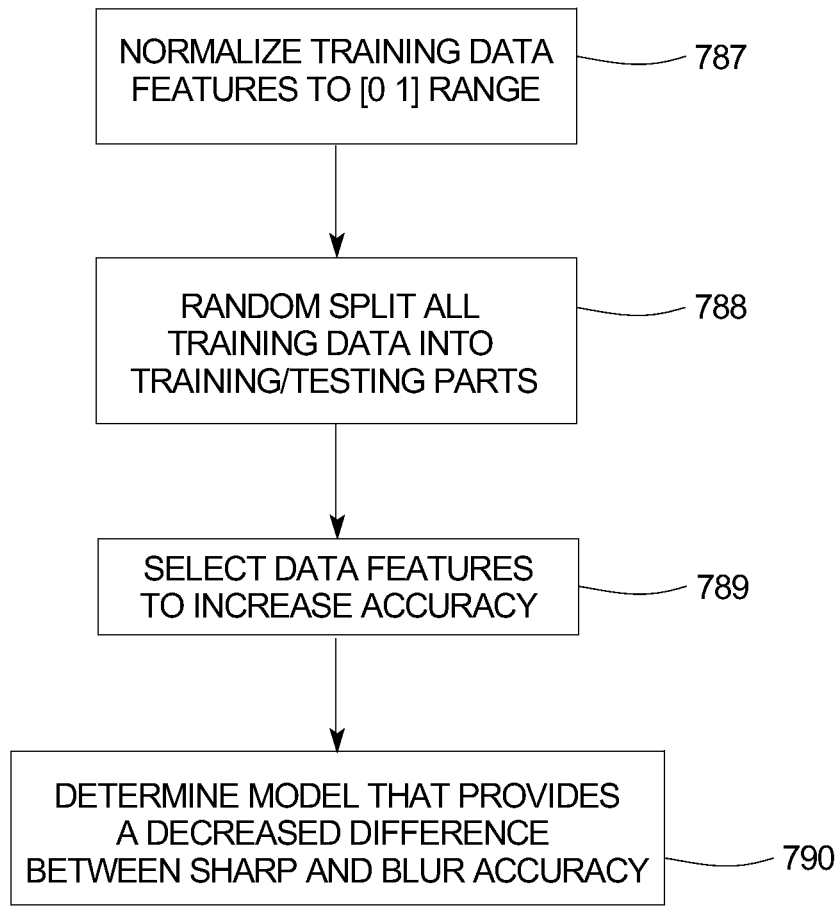
FIG. 7B is a flow chart that describes one embodiment for an LDA training from the embodiment illustrated in FIG. 6.

FIG. 7B is a flow chart that describes one embodiment for LDA training that occurs during step 665 in the embodiment illustrated in FIG. 6. In the embodiment in FIG. 7B, the data features and the metadata features are normalized to the [0 1] range or another suitable range, at step 787. In so doing, any bias toward any one particular data feature is reduced or avoided.

At step 788, in one embodiment, all normalized data features are randomly split into either training or testing parts in a manner that is substantially similar to that previously described herein.

At step 789, the data features are selected to ultimately increase the accuracy of the training model. In one embodiment, less than the total number of data features is used to generate the training model. Alternatively, all of the data features can be used. In the embodiment that uses fewer than the total number of data features, the method for selecting the data features can vary. In one embodiment, the data features can be selected one-at-a-time, starting with what is deemed to be the most important data feature (or one of the more important data features). Each of the remaining data features is then tested with this first data feature to determine which of the remaining data features provides the best performance and/or accuracy in conjunction with the first data feature. This process continues until the desired number of data features has been used. Alternatively, any suitable method for selecting data features can be utilized without deviating from the scope of the invention.

At step 790, in one embodiment, one model is selected that provides the least difference between sharp and blur accuracy. In this embodiment, each model is tested for accuracy for detecting both sharp images and blurred images. Once all models have been tested, the appropriate model is selected. For example, a first model may provide 92% sharp accuracy and 80% blur accuracy, while a second model may provide 90% sharp accuracy and 86% blur accuracy. Using this example, in one embodiment, the second model would be preferred because the range of accuracy between detecting sharp and blurred images is narrower. In various embodiments, the model selection criteria are application dependent. For instance, the application may require a higher sharp rate than blurry rate, so the best-fit model can be selected accordingly. In an alternative embodiment, another method can be utilized for selecting the appropriate model.

Referring back to FIG. 6, at step 668, the model can provide a threshold value for a sharp image or a blurred image, as described in greater detail below.

At step 670, essentially the same process is used for the test image that was used during the training phase 600 for collection of image features. Stated another way, the same types of image features are collected in substantially the same manner that was followed for step 663, except a test image is used.

Additionally, at step 672, essentially the same process is used for the test image that was used during the training phase 600 for collection of metadata features. Stated another way, the same types of metadata features are collected in substantially the same manner that was followed for step 664, except a test image is used.

Figure 7C:
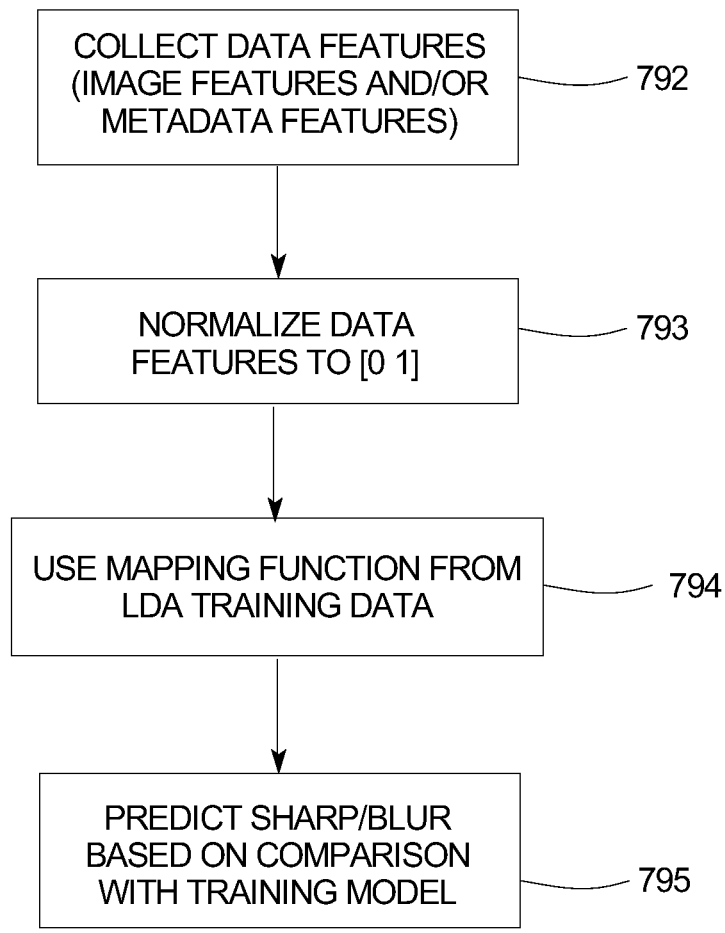
FIG. 7C is a flow chart that describes one embodiment for an LDA prediction from the embodiment illustrated in FIG. 6.

FIG. 7C is a flow chart that describes one embodiment for LDA prediction that occurs during the testing phase 602 at step 673 in the embodiment illustrated in FIG. 6. Step 792 in FIG. 7C also summarizes previously described steps 670 and 673 for the sake of continuity. The collected data features from step 792 are normalized to the range [0 1], or another suitable range at step 793, using the same mapping function from the LDA training phase 600 (illustrated in FIG. 6) at step 794. In one embodiment, the data features collected from the test image during the testing phase 602 are the same or substantially similar to those collected (and selected) during the training phase 600.

At step 795, a classifier predicts and/or determines whether the test image is sharp or blurry. In one embodiment, a weighted sum of the normalized data features is compared to the threshold value of the training model. Depending upon whether this threshold value is met or exceeded by the weighted sum value of the test image, the classifier can predict a sharp or blurry image for the test image. For example, in one embodiment, if the weighted sum value of the test image is less than the threshold value of the training model, and the center of projected blur image features is also less than the threshold of the training model, the image can be predicted to be blurry. Conversely, if the weighted sum value of the test image equal to or greater than the threshold value of the training model, and the center of projected sharp image features is also greater than the threshold of the training model, the image can be predicted to be sharp.

In another embodiment, the model can provide various ranges of values that can predict, to a desired confidence level, the extent of the blur in a test image. For example, if the test image value falls within a particular range of values, the test image can be categorized as "slightly blurred", rather than "blurred". This may be helpful to the user since a slightly blurred image may be worthy of further image manipulation to correct the blur, while a blurred image may not be correctable, and can be deleted to free up memory space and/or avoid printing time and resources.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for detecting whether a test image is blurred, the method comprising the steps of:
    extracting a training statistical signature that is based on a plurality of data features from a training image set including different images, the training image set including at least one sharp image and at least one blurry image, wherein extracting includes decomposing one of the images in the training image set using a multi-scale image decomposition that includes a plurality of levels;
    training a classifier to discriminate between the sharp image and the blurry image based on the training statistical signature; and
    applying the trained classifier to a test image that is not included in the training image set to predict whether the test image is sharp or blurry.

2. The method of claim 1 wherein the multi-scale image decomposition includes a Laplacian pyramid having a plurality of levels.

3. The method of claim 2 wherein the step of extracting includes measuring one or more statistical moments for at least one level of the Laplacian pyramid.

4. The method of claim 3 wherein the one or more statistical moments are selected from the group consisting of (i) a mean, (ii) a standard deviation, (iii) skewness, and (iv) kurtosis.

5. The method of claim 2 wherein the step of extracting includes estimating a covariance between level N and level N+1 of the Laplacian pyramid.

6. The method of claim 1 wherein the step of extracting includes extracting a metadata feature of at least one of the images.

7. The method of claim 6 wherein the metadata feature is selected from the group consisting of a focal length, an f-number, an ISO sensitivity, an exposure time, a flash, an exposure value and a handholdable factor (X).

8. The method of claim 1 wherein the multi-scale image decomposition includes a steerable pyramid.

9. The method of claim 1 wherein the multi-scale image decomposition includes a wavelet pyramid.

10. The method of claim 1 wherein the step of training includes training a non-linear support vector machine on the training statistical signature of the training image set.

11. The method of claim 1 wherein the step of training includes training a linear discriminant analysis on the training statistical signature of the training image set.

12. The method of claim 1 wherein the step of applying includes extracting a testing statistical signature from the test image.

13. The method of claim 1 wherein the step of applying includes the classifier predicting whether the test image is sharp or blurry due to motion blur.

14. The method of claim 1 wherein the step of applying includes the classifier predicting whether the test image is sharp or blurry due to defocus blur.

15. The method of claim 1 wherein the step of applying includes the classifier predicting whether the test image is sharp or blurry based on a compression level of the test image.

16. A method for detecting whether a test image is blurred, the method comprising the steps of:
   extracting a training statistical signature that is based on a plurality of data features from a training image set including different images, the training image set including at least one sharp image and at least one blurry image, at least one of the images in the training set being decomposed using a multi-scale image decomposition that includes a plurality of levels; and
   training a classifier to discriminate between the sharp image and the blurry image based on the training statistical signature.

17. The method of claim 16 wherein the multi-scale image decomposition includes a Laplacian pyramid having a plurality of levels.

18. The method of claim 17 wherein the step of extracting includes measuring one or more statistical moments for at least one level of the Laplacian pyramid.

19. The method of claim 18 wherein the one or more statistical moments are selected from the group consisting of (i) a mean, (ii) a standard deviation, (iii) skewness, and (iv) kurtosis.

20. The method of claim 17 wherein the step of extracting includes estimating a covariance between level N and level N+1 of the Laplacian pyramid.

21. The method of claim 16 wherein the step of extracting includes extracting a metadata feature of at least one of the images.

22. The method of claim 21 wherein the metadata feature is selected from the group consisting of a focal length, an f-number, an ISO sensitivity, an exposure time, a flash, an exposure value and a handholdable factor (X).

23. The method of claim 16 wherein the multi-scale image decomposition includes a steerable pyramid.

24. The method of claim 16 wherein the multi-scale image decomposition includes a wavelet pyramid.

25. The method of claim 16 wherein the step of training includes training a non-linear support vector machine on the training statistical signature of the training image set.

26. The method of claim 16 wherein the step of training includes training a linear discriminant analysis on the training statistical signature of the training image set.

27. The method of claim 21 further comprising the step of applying the trained classifier to a test image that is not included in the training image set to predict whether the test image is sharp or blurry.

28. A method for detecting whether a test image is blurred, the method comprising the steps of:
   extracting a training statistical signature that is based on a plurality of data features from a training image set including different images, the training image set including at least one sharp image and at least one blurry image, the images in the training set being decomposed using a multi-scale image decomposition that includes a plurality of levels, the training statistical signature being based on (i) one or more statistical moments for each of the levels for each of the images, (ii) a covariance between level N and level N+1 of the multi-scale image decomposition for each of the images, and (iii) a metadata feature for each of the images;
   training a classifier to discriminate between the sharp image and the blurry image based on the training statistical signature; and
   applying the trained classifier to a test image that is not included in the training image set to predict whether the test image is sharp or blurry.

29. The method of claim 28 wherein the one or more statistical moments are selected from the group consisting of (i) a mean, (ii) a standard deviation, (iii) skewness, and (iv) kurtosis.

30. The method of claim 28 wherein the metadata feature is selected from the group consisting of a focal length, an f-number, an ISO sensitivity, an exposure time, a flash, an exposure value and a handholdable factor (X).

31. The method of claim 28 wherein the multi-scale image decomposition includes a steerable pyramid.

32. The method of claim 28 wherein the multi-scale image decomposition includes a wavelet pyramid.

33. The method of claim 28 wherein the step of training includes training a non-linear support vector machine on the training statistical signature of the training image set.

34. The method of claim 28 wherein the step of training includes training a linear discriminant analysis on the training statistical signature of the training image set.

35. The method of claim 28 wherein the step of applying includes the classifier predicting whether the test image is sharp or blurry due to motion blur.

36. The method of claim 28 wherein the step of applying includes the classifier predicting whether the test image is sharp or blurry due to defocus blur.

37. The method of claim 28 wherein the step of applying includes the classifier predicting whether the test image is sharp or blurry based on a compression level of the test image.

* * * * *